United States Patent [19]

Balaban et al.

[11] Patent Number: 4,464,675

[45] Date of Patent: Aug. 7, 1984

[54] LOW FREQUENCY DIGITAL COMB FILTER SYSTEM

[75] Inventors: Alvin R. Balaban, Lebanon; Steven A. Steckler, Clark, both of N.J.

[73] Assignee: RCA Corporation, New York, N.Y.

[21] Appl. No.: 405,165

[22] Filed: Aug. 4, 1982

[51] Int. Cl.³ .......................................... H04N 9/535
[52] U.S. Cl. .................................................... 358/31
[58] Field of Search .................................. 358/13, 31

[56] References Cited

U.S. PATENT DOCUMENTS

| | | |
|---|---|---|
| 3,858,240 | 12/1974 | Golding et al. |
| 4,096,516 | 6/1978 | Pritchard ............................. 358/31 |
| 4,218,700 | 8/1980 | Kashigi ................................ 358/31 |
| 4,322,739 | 3/1982 | Drewery et al. |
| 4,348,689 | 9/1982 | Achiha ................................ 358/31 |
| 4,400,718 | 8/1983 | Lee ..................................... 358/13 |
| 4,422,094 | 12/1983 | Lewis ................................. 358/31 |

FOREIGN PATENT DOCUMENTS 2050746  1/1981  United Kingdom.

OTHER PUBLICATIONS

IEEE Journal of Solid–State Circuits, vol. SC–16, No. 3, 6/81, New York, Harry J. M. Veedrick, "An NMOS Dual-Mode Digital Low-Pass Filter for Color TV", pp. 179–182, (FIG. 3, p. 179).
Proceedings of the IEEE, vol. 69, No. 3, Mar. 1981, New York, R. E. Crochiere and L. R. Rabiner, "Interpolation and Decimation of Digital Signals-A Tutorial Review", pp. 300–331.
"Sub–Nyquist-Encoded PCM NTSC Color Television", by John P. Rossi, Pub. in Jan., 1976, SMPTE Journal, vol. 85, No. 1.
"A Discussion of Sampling Theorems", by D. A. Linden, Pub. in Jul., 1959, Proceedings of the IRE.
"Digivision" ITT Semiconductor Development Data, Aug. 1982.
T. Fischer, "What is the Impact of Digital TV", IEEE Transactions on Consumer Electronics, vol. CE-28, No. 3, Aug. 1982, pp. 423–429.
Exhibit "A", Digit 2000 VLSI Digital TV System, ITT Semiconductor (Confidential).

Primary Examiner—Michael A. Masinick
Attorney, Agent, or Firm—E. M. Whitacre; P. J. Rasmussen; E. P. Herrmann

[57] ABSTRACT

A comb filter arrangement operating at a reduced data rate is provided, which requires comparably fewer storage locations than previous arrangements. A digitized composite video signal of a given codeword rate is applied to a first bandpass filter, which produces a filtered signal restricted to a portion of the passband of the composite video signal. The filtered signal is then subsampled at a rate which satisfies the Nyquist criterion for information of the restricted passband. Codewords, now at a reduced data rate, are applied to a one-H delay line, and delayed and undelayed signals are combined to produce a first comb-filtered signal. The first comb-filtered signal is then applied to a second bandpass filter, which provides a sequence of codewords at the codeword rate of the original digitized composite video signal over a given frequency band. This sequence of codewords is then combined with the codewords of the composite video signal to produce a second comb-filtered signal.

13 Claims, 13 Drawing Figures

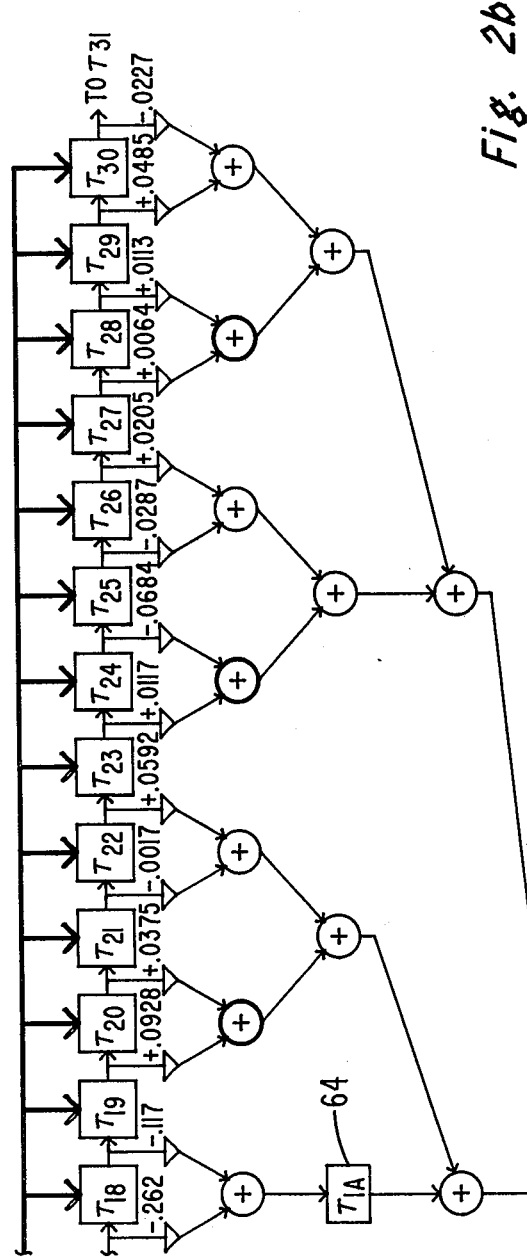
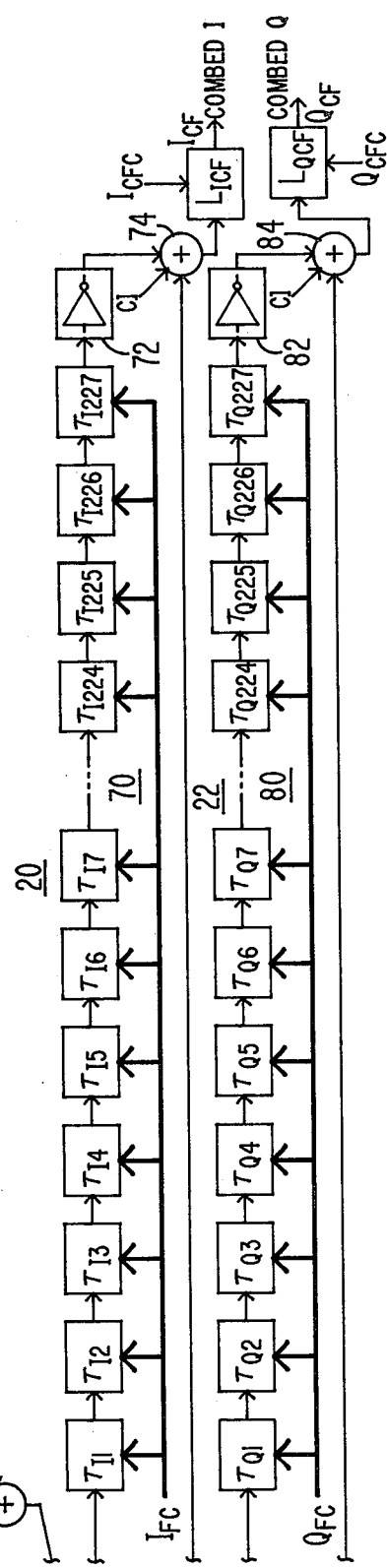
Fig. 2b

LOW FREQUENCY DIGITAL COMB FILTER SYSTEM

This invention relates to signal separation systems and, in particular, to a comb filter arrangement for separating the luminance and chrominance components of a digitized video signal at a reduced data rate.

Conventional television broadcast systems are arranged so that much of the brightness (luminance) information contained in an image is represented by signal frequencies which are concentrated about integral multiples of the horizontal line scanning frequency. Color (chrominance) information is encoded and inserted in a portion of the luminance signal spectrum around frequencies which lie halfway between the multiples of the line scanning frequency (i.e., at odd multiples of one-half the line scanning frequency).

Chrominance and luminance information can be separated by appropriately combing the composite signal spectrum. Known combing arrangements take advantage of the fact that the odd multiple relationship between chrominance signal components and the line scanning frequency causes the chrominance signal components for corresponding image areas on successive lines to be 180° out of phase with each other. Luminance signal components for corresponding image areas on successive lines are substantially in phase with each other.

In a comb filter system, one or more replicas of the composite image-representative signal are produced which are time delayed from each other by at least one line scanning interval (a so-called one-H delay). The signals from one line are added to signals from a preceding line, resulting in the cancellation of the chrominance components, while reinforcing the luminance components. By subtracting the signals of two successive lines (e.g., by inverting the signals of one line and then combining the two), the luminance components are cancelled while the chrominance components are reinforced. Thus, the luminance and chrominance signals may be mutually combed and thereby may be separated advantageously.

The composite video signal may be comb filtered in an analog form, a sampled data form, or a digital form. Comb filters using analog signal glass delay lines for the (approximately) one-H delay lines are commonly employed in PAL-type receivers to separate the red and blue color difference signals, taking advantage of the one-quarter line frequency offset of the interlacing of the two signals. An example of a comb filter system for a sampled data signal is shown in U.S. Pat. No. 4,096,516, in which the delay line comprises a 682½ stage charge-coupled device (CCD) delay line which shifts signal samples from stage to stage at a 10.7 MHz rate to achieve a one-H delay. The article "Digital Television Image Enhancement" by John P. Rossi, published in Volume 84 of the Journal of the Society of Motion Picture and Television Engineers (1974) beginning at page 37 shows a digital comb filter in which the one-H delay is provided by a digital storage medium for 682 codewords which is accessed at a 10.7 MHz rate.

In the CCD delay line described in the above-referenced U.S. patent, 682½ stages are needed to transfer charge packets related to the analog video signal. In the digital delay line described in the Rossi article, the video signal is in the form of eight-bit digital codewords. This arrangement requires the use of eight storage locations for each of the 682 codewords in a horizontal line, or a storage medium for 5,456 bits. Moreover, this delay line is only of sufficient size for a system in which an NTSC color video signal is sampled at a rate of three times per subcarrier cycle (i.e., using a 10.738635 MHz sampling signal). Another advantageous sampling frequency for digitizing the analog video signal is 14.3181818 MHz, or four times the color subcarrier frequency. A one-H digital delay line operating at this frequency requires storage for 910 codewords which, at eight bits per codeword, utilizes a total of 7280 storage locations. Since a storage medium of this capacity is difficult to fabricate economically, it is desirable to provide a digital comb filter system which requires fewer storage locations.

In accordance with the principles of the present invention, a comb filter arrangement operating at a reduced data rate is provided, which requires comparably fewer storage locations than previous arrangements. A digitized composite video signal of a given codeword rate is applied to a first bandpass filter, which produces a filtered signal restricted to a portion of the passband of the composite video signal. The filtered signal is then subsampled at a rate which satisfies the Nyquist criterion for information of the restricted passband. Codewords, now at a reduced data rate, are applied to a one-H delay line, and delayed and undelayed signals are combined to produce a first comb-filtered signal. The first comb-filtered signal is then applied to a second bandpass filter, which provides a sequence of codewords at the codeword rate of the original digitized composite video signal over a given frequency band. This sequence of codewords is then combined with the codewords of the composite video signal to produce a second comb-filtered signal.

In the drawings:

FIGS. 2A and 2B illustrate in block diagram form a bandpass filter and comb filter arrangement suitable for use in the embodiment of FIG. 1;

FIG. 12 contains response characteristics illustrating principles of operation of the embodiments of the present invention.

Figure 1:
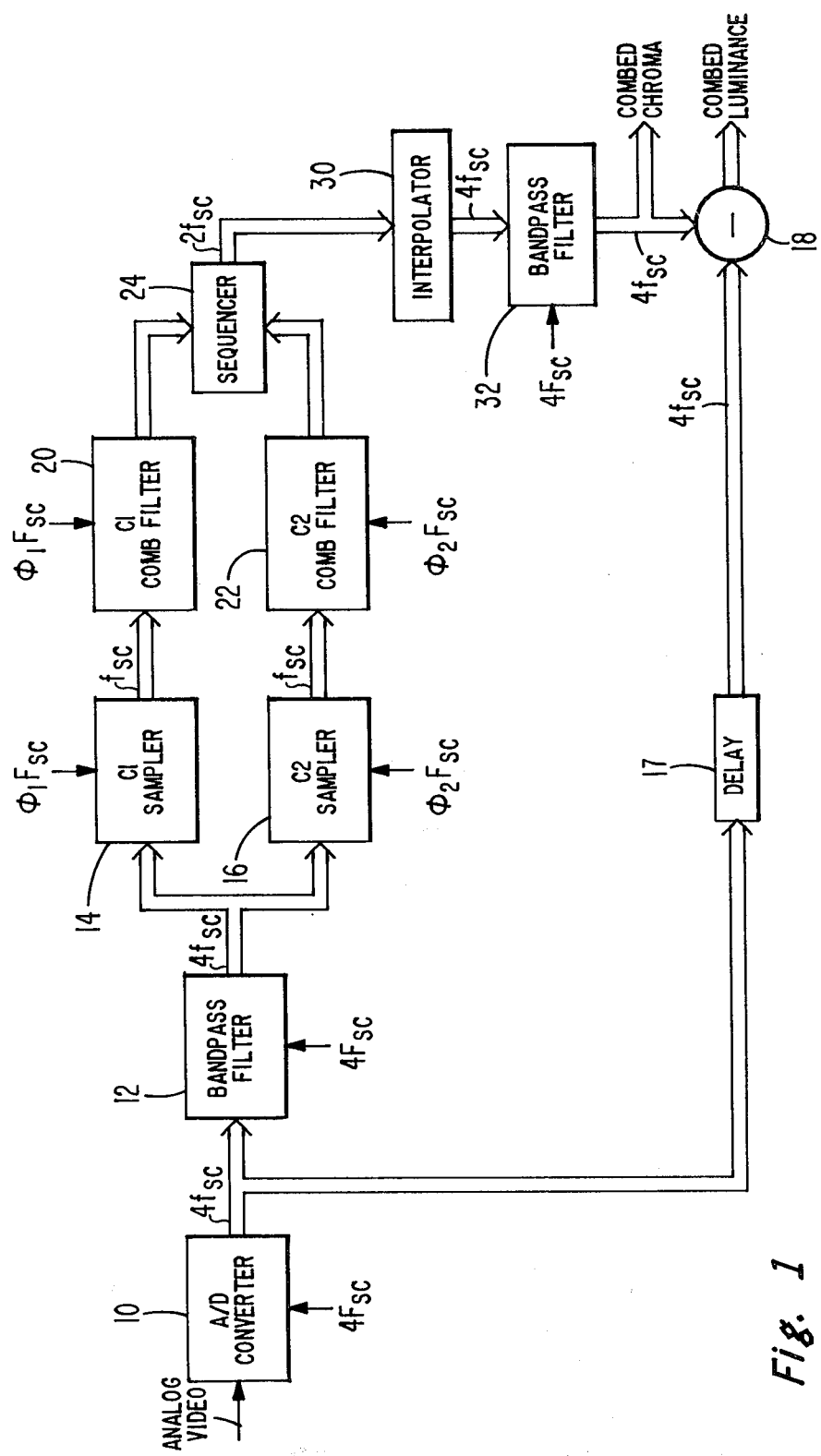
FIG. 1 illustrates in block diagram form a digital comb filter system constructed in accordance with the principles of the present invention.

Referring to FIG. 1, a comb filter system constructed in accordance with the principles of the present invention is shown. In FIG. 1, single-line arrows represent paths for individual signals, and broad arrows represent data paths for multibit digital codewords.

In FIG. 1, a composite analog video signal is applied to the input of an analog-to-digital (A/D) converter 10. The A/D converter samples the analog video signal in response to a sampling signal ($4F_{sc}$) and produces digital video codewords at the sampling signal frequency. In the embodiment of FIG. 1, the sampling signal frequency $4f_{sc}$ is equal to four times the color subcarrier frequency, where $f_{sc}$ is the color subcarrier frequency. In the NTSC color television system in which the color subcarrier frequency is 3.579545 MHz, the $4F_{sc}$ sampling signal frequency is 14.31818 MHz.

The $4f_{sc}$ rate digital codewords produced by the A/D converter 10 are applied to inputs of a delay stage 17 and a digital bandpass filter 12. The passband of the bandpass filter 12 for NTSC video signals includes the chrominance frequencies which are distributed about the 3.58 MHz color subcarrier frequency. The delay stage 17 provides an equalizing delay which matches the delays encountered by signals between the input of the bandpass filter 12 and the output of a bandpass filter 32.

Bandpass filtered signals in a $4f_{sc}$ rate sequence are produced at the output of the bandpass filter 12. This sequence is subsampled by a C1 sampler 14 and a C2 sampler 16, which pass codewords at two different phases of an $f_{sc}$ rate signal, respectively. The samplers thus subsample the $4f_{sc}$ rate sequence at a color subcarrier ($f_{sc}$) rate in response to the differently phased sampling signals $\phi_1 F_{sc}$ and $\phi_2 F_{sc}$.

Output signals from the samplers 14 and 16 are applied to a C1 comb filter 20 and a C2 comb filter 22, respectively. The comb filters 20 and 22 comb filter the applied signals, producing comb filtered codewords at an $f_{sc}$ rate. The comb filters are clocked by the same $\phi_1 F_{sc}$ and $\phi_2 F_{sc}$ sampling signls as the samplers. The output codewords of the comb filters are then combined in an interleaved sequence of codewords at a $2f_{sc}$ rate. This codeword sequence is then applied to an interpolator 30, which produces a sequence of codewords at the original rate of $4f_{sc}$. This codeword sequence is filtered by a bandpass filter 32 so as to pass only codewords in a given bandpass of comb-filtered codewords. The bandpass filtered codewords are then subtracted from the delayed composite video signal codeword sequence passed by the delay stage 14, resulting in the production of a second sequence of comb filtered codewords. In the embodiment of FIG. 1, comb filtered chrominance signals in the chrominance passband are produced at the output of the bandpass filter 32. These signals are then subtracted from the composite video signal to produe comb filtered luminance signals.

The arrangement of FIG. 1 is advantageous in that the differently phased comb filters 20 and 22 are operated at the subcarrier frequency. For NTSC signal samples, each comb filter will include a one-H delay line clocked at the subcarrier frequency of approximately 3.58 MHz, resulting in a one-H delay line length of 227 stages per filter. For example, if the codewords applied to the comb filters are eight bits in length, each one-H delay line will require only 1816 storage locations, or a total of 3632 storage locations for both comb filters. This compares favorably with the 7280 storage locations required for a comb filter operating on eight-bit codewords at a $4f_{sc}$ rate. Design of the system is simplified in that the two bandpass filters 12 and 32 can be FIR filters of the same order using the same weighting coefficients. In addition, the bandpass filter 32 may be arranged to provide the interpolation function, as will be subsequently described.

Figure 2A:
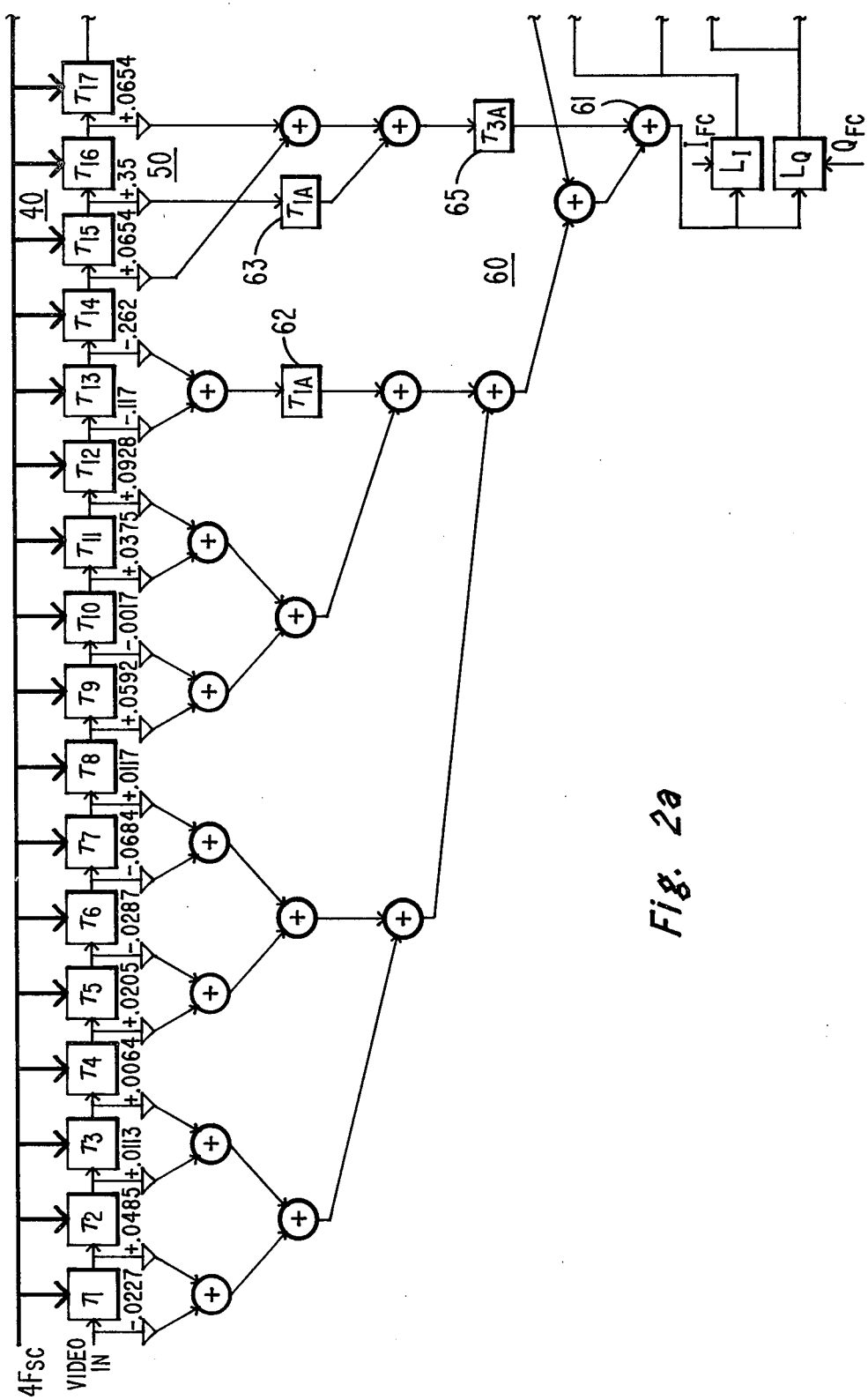
Figure 6:
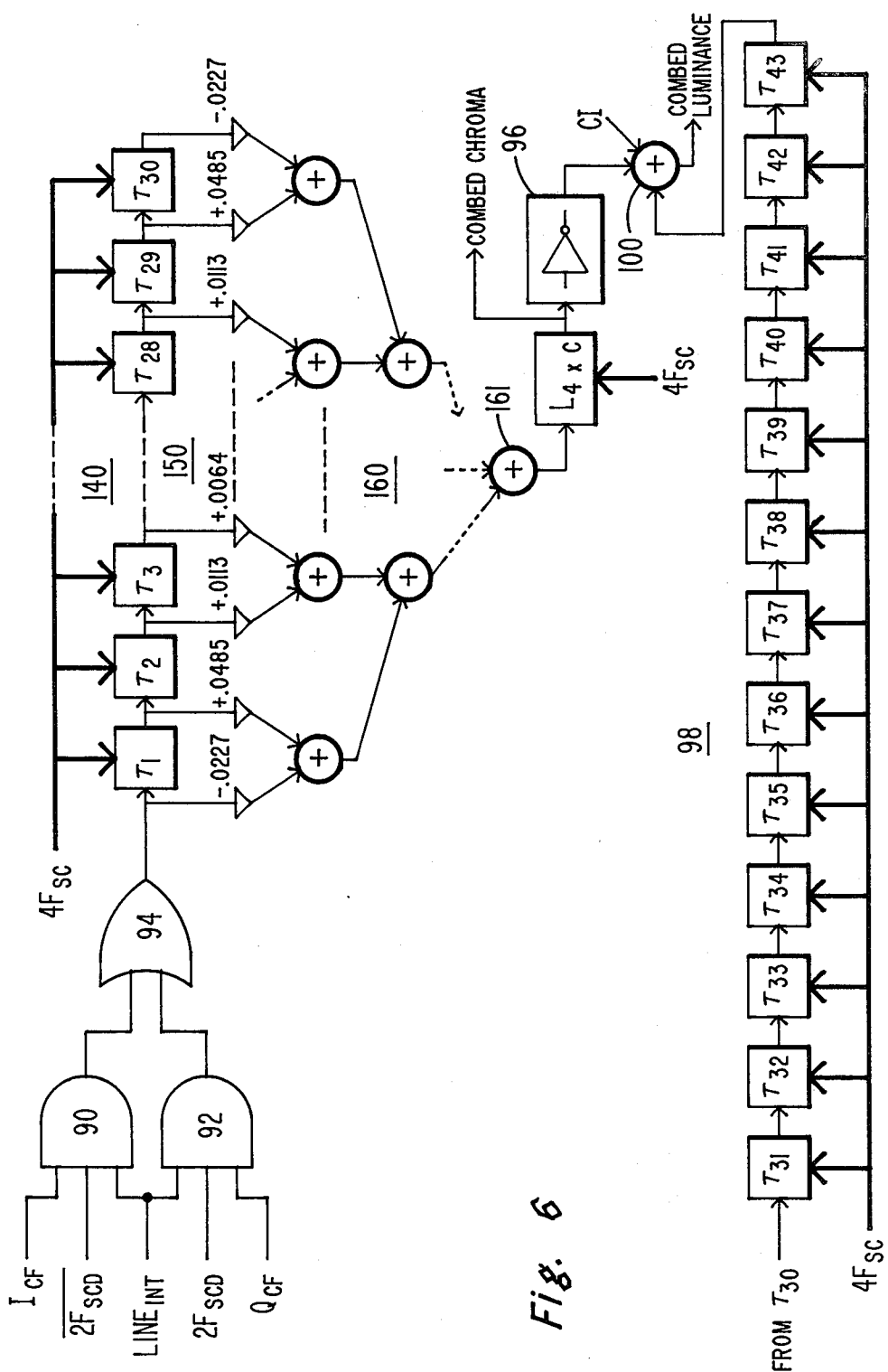
FIG. 6 illustrates in block diagram form an interpolating filter suitable for use in the embodiment of FIG. 1.

A digital bandpass filter suitable for use as bandpass filter 12 in the embodiment of FIG. 1 is shown in detail in FIGS. 2a and 2b, which interconnect at the broken connections at the sides of the Figures. In FIGS. 2a, 2b, and 6, thin lines depict data paths for multibit codewords and broad lines depict clock signal paths.

The bandpass filter of FIGS. 2a and 2b comprise a 31-stage output tapped FIR filter, including a shift register 40 of thirty delay elements $\tau_1$-$\tau_{30}$, thirty-one coefficient weighting circuits 50, and an adder tree 60. Codewords of the video signal produced by the A/D converter are applied to the input of the first stage $\tau_1$ of the shift register 40, and are shifted through the register by a $4F_{sc}$ clock signal. Codeword samples are tapped from the input of the first stage and the output of each stage of the shift register and are applied to the coefficient weighting circuits 50. Precise coefficient values are shown in FIGS. 2a and 2b ($-0.0277$, $+0.0485$, $+0.0113$, etc.), which may be implemented using coefficient multiplier circuits which multiply each tapped signal by the appropriate coefficient value. If desired, the coefficient weighting circuits can also be implemented using a shift-and-add technique by rounding off the coefficient values to the nearest multiple of an inverse power of two. For instance, the weighting coefficient at the output of stage $\tau_1$ has a value of $+0.0485$. The nearest multiple of an inverse power of two is 3/64, which is equal to 0.046875. Weighting by this value is achieved by shifting the tapped signal to the right by six places, which weights the tapped signal by 1/64, and by shifting the tapped signal to the right by five places, which weights the signal by 1/32. The two shifted signals are then added to produce a value equal to 3/64 times the tapped signal. Circuitry for performing the shift-and-add function is shown in United States patent application Ser. No. 363,827, entitled "Digital Filter Circuits" by Lauren A. Christopher, filed Mar. 31, 1982.

The tapped and weighted signals are applied to the adder tree 60, in which they are combined by the adders to produce a filtered signal at the output of the final adder 61. It is essential that the tapped and weighted signals all arrive at the output of the final adder 61 at the same time. To insure that this will happen, each signal from a coefficient weighting circuit is routed to the output through six adders, or delays equivalent to six adders. It may be seen that tapped signals from shift register stages $\tau_{12}$-$\tau_{18}$ encounter fewer than six adders on their passage from the coefficient weighting circuits to the output of adder 61. To equalize the propagation delays of these signal paths with respect to the remaining signal paths, delays 62-64 equivalent to the propagation time of one adder tree adder and a delay 65 equivalent to the propagation time of three adders are inserted into these shorter paths. Thus, the adder tree will delay each tapped and weighted signal by the propagation time of six adders between the coefficient weighting circuits and the output of adder 61.

The filtered signals at the output of adder 61 are selectively sampled by latches $L_I$ and $L_Q$ in response to clock signals $I_{FC}$ and $Q_{FC}$. The $I_{FC}$ and $Q_{FC}$ clock signals each have a frequency of $f_{sc}$ (3.58 MHz in the NTSC system) to sample one of every four filtered signal samples. The $I_{FC}$ and $Q_{FC}$ clock signals also sample the filtered signals at respectively different phases of the color subcarrier signal and in this embodiment exhibit a 90° phase relationship with respect to each other.

The signal samples in the $L_I$ and $L_Q$ latches are then applied to two comb filters 20 and 22. Each comb filter includes a 227 stage delay line 70 and 80, which delays the applied signals by one horizontal line interval. The delay lines 70 and 80 are clocked by the same $I_{FC}$ and $Q_{FC}$ clock signals that are used by the $L_I$ and $L_Q$ latches. The bits of the delayed codewords are inverted, or one's complemented by inverting circuits 72 and 82 and applied to inputs of respective adders 74 and 84. Respective undelayed signals are also applied to the adders 74 and 84. A least significant "carry-in" bit CI with a weight of the least significant "one" bit is also applied to each adder which, together with the one's complement of the delayed codewords, accomplishes a two's complementing of the delayed signals for subtraction. The adders 74 and 84 will thereby effectively subtract the delayed codewords from the undelayed codewords to produce comb filtered signals at their outputs. These comb filtered signals are latched into respective latches $L_{ICF}$ and $L_{QCF}$ by differently phased $f_{sc}$ rate clock signals $I_{CFC}$ and $Q_{CFC}$. Thus, sequences $I_{CF}$ and $Q_{CF}$ of comb filtered signal samples are produced at the outputs of latches $L_{ICF}$ and $L_{QCF}$. These signal samples are available for subsequent processing in a chrominance signal processor to produce demodulated color mixture signals.

In FIG. 6, the comb filtered chrominance signal sequences $I_{CF}$ and $Q_{CF}$ are used to produce a comb filtered luminance signal. The outputs of the $L_{ICF}$ and $L_{QCF}$ latches are coupled to inputs of respective AND gates 90 and 92. The AND gates 90 and 92 are also coupled to receive complementary clock signals $\overline{2F_{SCD}}$ and $2F_{SCD}$, respectively. A third clock signal, LINE$_{INT}$, is applied to third inputs of AND gates 90 and 92. The outputs of AND gates 90 and 92 are coupled to the inputs of an OR gate 94, the output of which is coupled to the input of a bandpass filter.

The purpose of the following bandpass filter is to create a sequence of comb filtered chrominance signals in the chrominance passband at a $4f_{sc}$ clock rate. The bandpass filter of FIG. 6 is constructed in the same manner as the input bandpass filter of FIG. 2, being of the same filter order with the same weighting coefficient values. The bandpass filter of FIG. 6 includes a thirty stage shift register 140, thirty-one coefficient weighting circuits 150, and an adder tree 160 having a final output adder 161. For ease of illustration, only a portion of these circuit elements are shown in FIG. 6.

The shift register 140 of the bandpass filter is clocked at a $4f_{sc}$ rate by the $4F_{sc}$ clock signal. Bandpass filtered output signals from the final adder 161 are latched into latch $L_{4XC}$ by the $4F_{sc}$ clock signal. The $4f_{sc}$ codeword sequence produced by latch $L_{4XC}$ comprises comb filtered chrominance information in the chrominance passband, which is also available for subsequent demodulation and processing. The bits of each codeword in the $4f_{sc}$ sequence are one's complemented, or inverted, by an inverting circuit 96. The one's complemented codewords are applied to an adder 100 together with a carry-in bit CI to form two's complemented chrominance signals for subtraction from the composite video signal. Composite video signal codewords are applied to a second input of the adder 100 by way of a fifteen stage shift register delay line 98 having the input to the first stage $\tau_{31}$ coupled to the output of the shift register 40 of the input bandpass filter. The shift register 98 is clocked by the $4F_{sc}$ clock signal and acts to present composite video signal codewords to the adder 100 in time coincidence with corresponding comb filtered chrominance signal samples. The adder 100 thus produces a comb filtered luminance signal which has been combed over the chrominance passband. The comb filtered luminance signal is available at the output of adder 100 for subsequent luminance signal processing.

Figure 3:
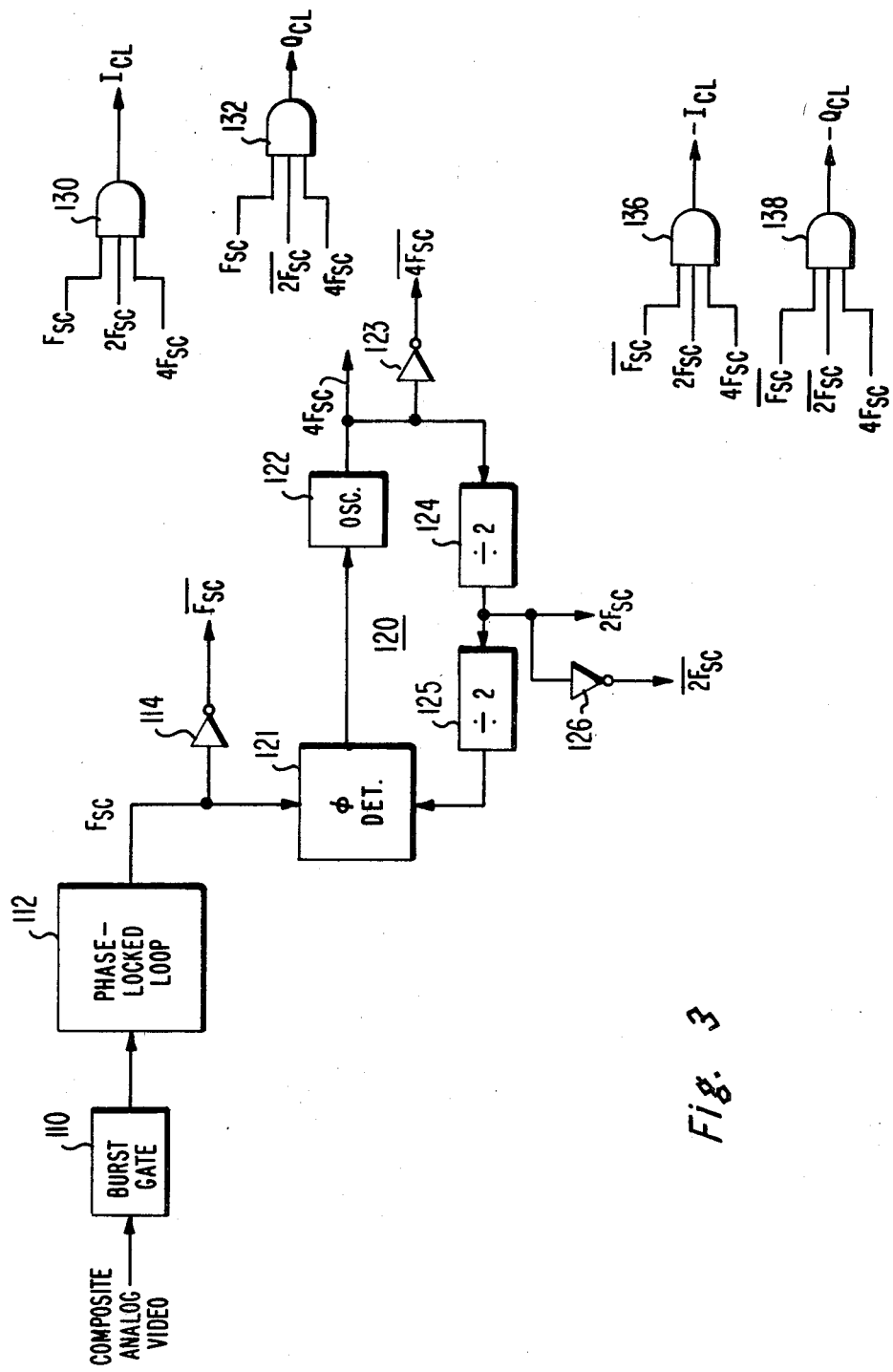
FIGS. 3 and 5 illustrate in block and logic diagram form a clock generator circuit for the comb filter system of FIGS. 2 and 6.
Figure 4:
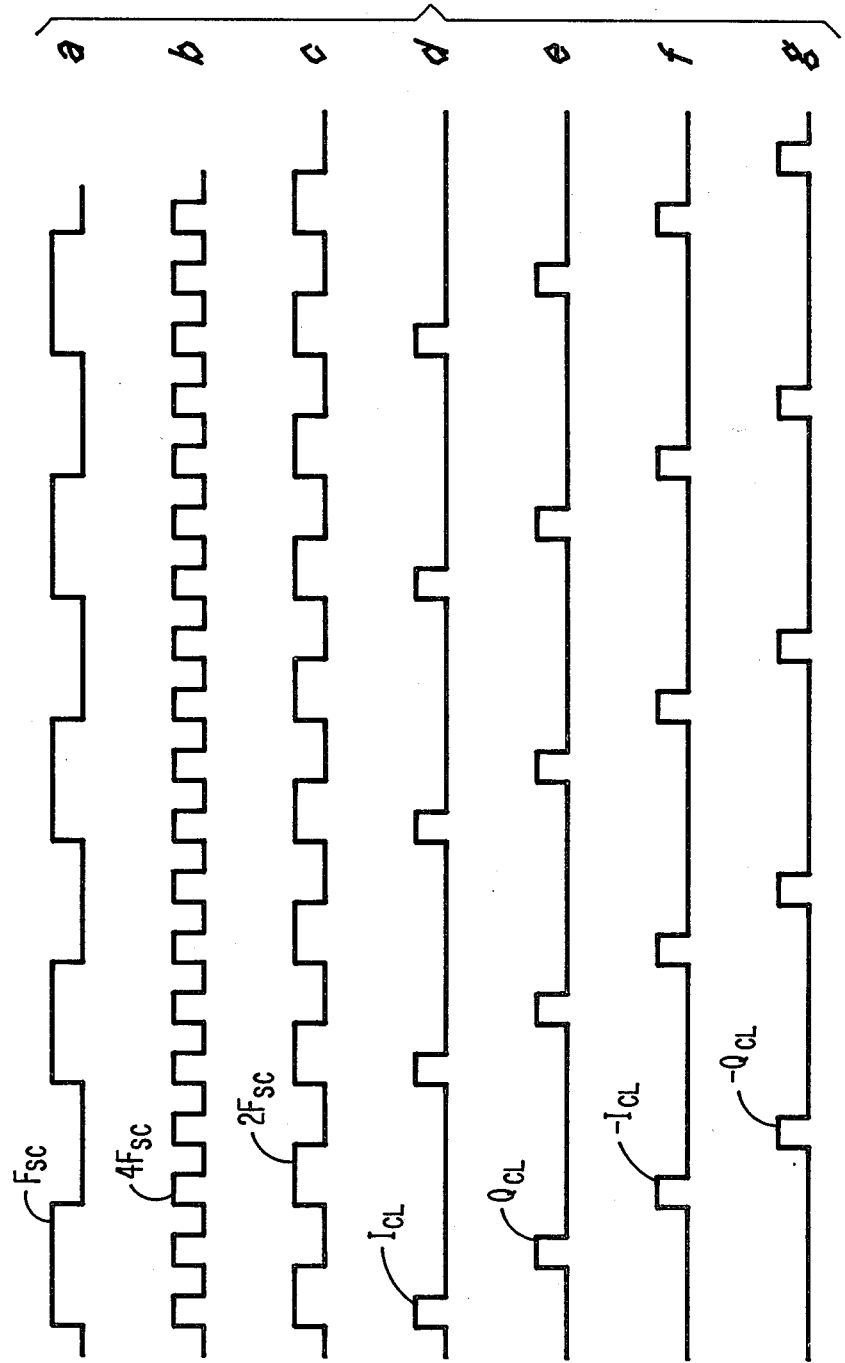
FIGS. 4 and 7 illustrate timing diagrams used to explain the operation of the clock generator circuit of FIGS. 3 and 5.
Figure 5:
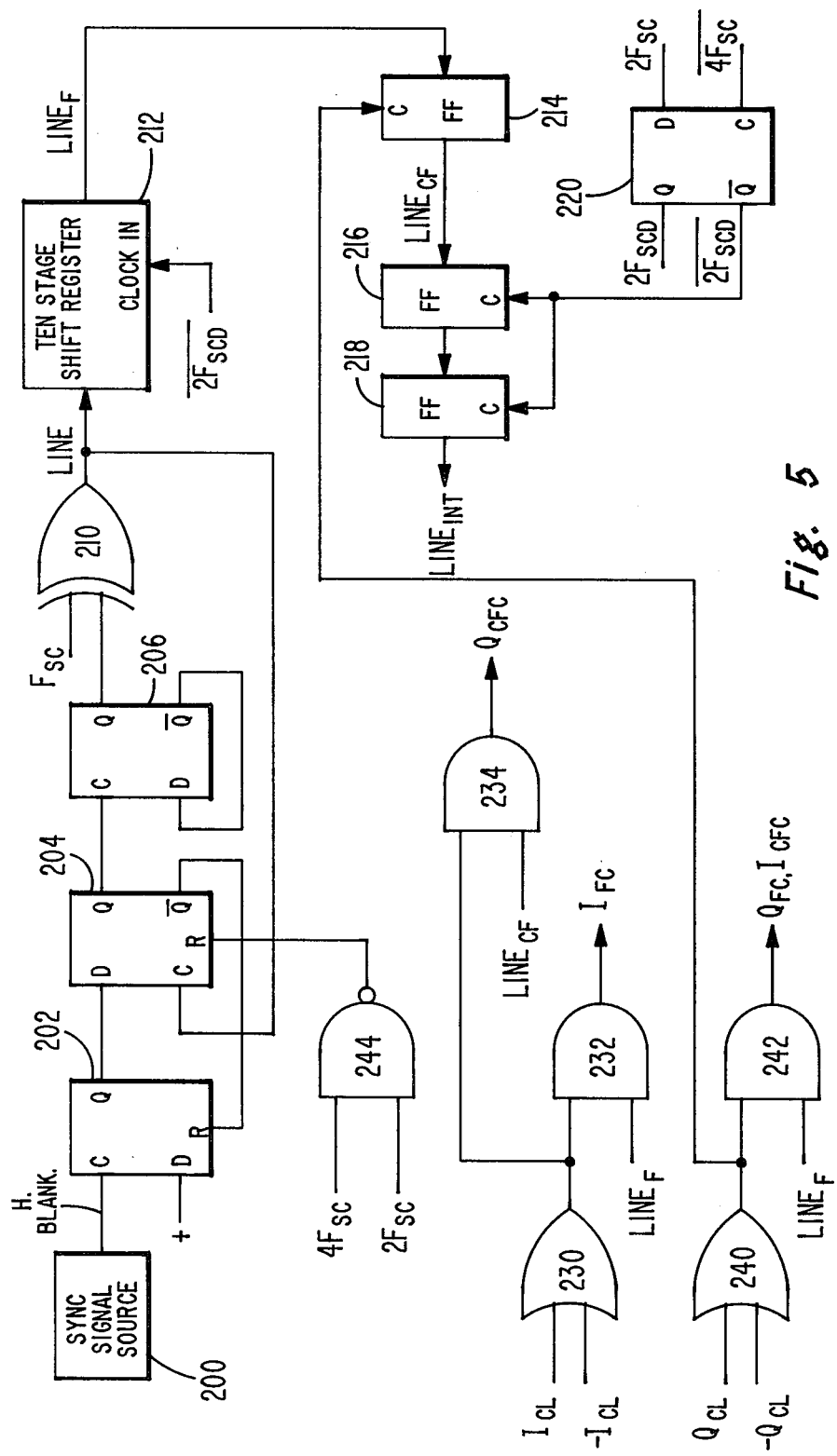
Figure 7:
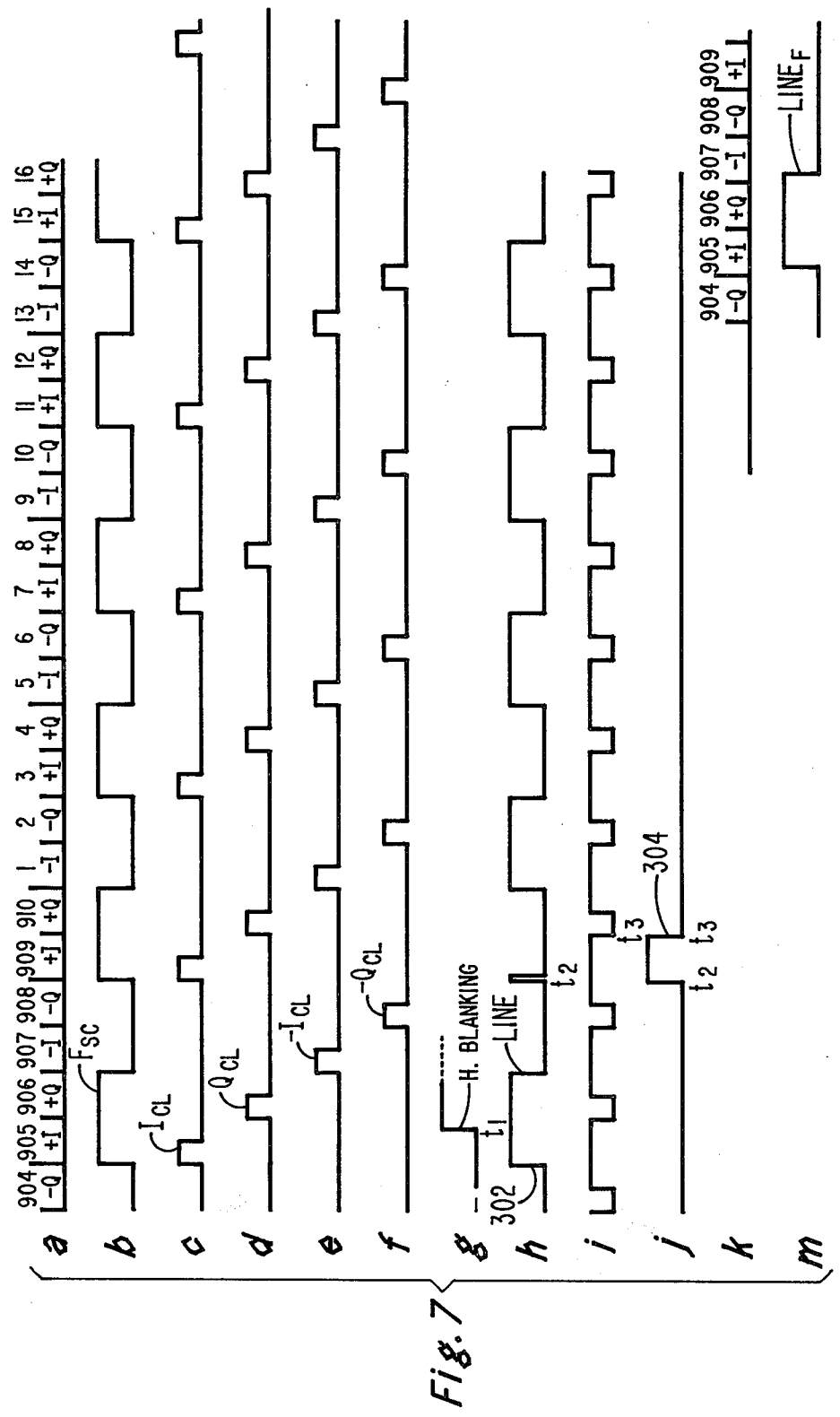

Clock signals for the embodiment of FIGS. 2 and 6 are produced by the clock generating circuitry of FIGS. 3 and 5. The composite analog video signal is applied to a burst gate 110 in FIG. 3, which gates the color burst signal to a phase-locked loop 112. The phase-locked loop 112 produces a signal $F_{sc}$ at the color subcarrier frequency phase locked with the color burst signal. An $F_{sc}$ signal waveform is shown in FIGS. 4a and 7b. For I, Q chrominance sampling of an NTSC signal, a delay equal to 57° of the $F_{sc}$ signal is inserted at the output of the phase-locked loop 112. In this instance the positive going transitions of the $F_{sc}$ waveform of FIGS. 4a and 7b would lag the positive peaks of the color burst signal by 57°.

An inverter 114 is coupled to receive the $F_{sc}$ signal and produces a complementary signal $\overline{F_{sc}}$ at its output. The $F_{sc}$ signal is also applied to a phase detector 121 of a second phase-locked loop 120. The phase detector 121 produces a control signal to control the phase and frequency of an oscillator 122, which produces a $4F_{sc}$ signal at four times the color subcarrier frequency, as shown in FIG. 4b. The $4F_{sc}$ signal is applied to an inverter 123 to produce a complementary $\overline{4F_{sc}}$ signal, and to a divide-by-two circuit 124. The divide-by-two circuit 124 produces a $2F_{sc}$ signal at twice the subcarrier frequency, as shown in FIG. 4c. The $2F_{sc}$ signal is inverted by an inverter 126 to produce a complementary $\overline{2F_{sc}}$ signal. The $2F_{sc}$ signal is also applied to the input of a second divide-by-two circuit 125, which produces an $f_{sc}$ rate signal for the phase detector 121. Thus, the $F_{sc}$, $4F_{sc}$ and $2F_{sc}$ signals and their complements are maintained in substantial phase synchronism.

The $F_{sc}$, $2F_{sc}$ and $4F_{sc}$ signals are applied to inputs of an AND gate 130 to produce pulses of an $I_{CL}$ signal when all of the input signals are high, as shown in FIGS. 4d and 7c. Similarly, the $F_{sc}$, $\overline{2F_{sc}}$ and $4F_{sc}$ signals are applied to inputs of an AND gate 132, which produces a $Q_{CL}$ signal as shown in FIGS. 4e and 7d. The $\overline{F_{sc}}$, $2F_{sc}$ and $4F_{sc}$ signals are applied to inputs of an AND gate 136 to produce clock signal $-I_{CL}$ which is illustrated in FIGS. 4f and 7e. The $\overline{F_{sc}}$, $\overline{2F_{sc}}$ and $4F_{sc}$ signals are applied to inputs of an AND gate 138 to produce clock signal $-Q_{CL}$ as shown in FIGS. 4g and 7f.

By reason of the odd multiple frequency relationship between the line scanning (horizontal synchronizing) frequency and the color subcarrier ($f_{sc}$) frequency, codeword samples on one video line of information are of opposite phase with respect to vertically aligned samples on succeeding and preceding lines. That is, if the first codeword on one line is a +I sample, the first codeword on the next line is a −I sample. This relationship, which underlies the principle of comb filtering, requires that the phases of the I and Q sampling signals be changed from line-to-line so that +I and +Q samples will be selected on one line and combined with vertically aligned −I and −Q samples on the next line. In addition, the output bandpass filter of FIG. 6 must be operated so that, on one line, +I and +Q samples are loaded into the shift register 140 at the proper times, and that −I and −Q samples are loaded into the shift register 140 at respectively different times during the following line.

Clock circuitry which performs the necessary phase shifts of the clock signals from one line to another is shown in FIG. 5. In FIG. 5, a synchronizing signal source 200 provides a horizontal blanking signal, which is applied to the clock input of a D-type flip-flop 202. The data input of flip-flop 202 is coupled to a source of logical one level voltage (+). The Q output of flip-flop 202 is coupled to the data input of a D-type flip-flop 204. The Q output of flip-flop 204 is coupled to the clock input of a D-type flip-flop 206, and the $\overline{Q}$ output of flip-flop 204 is coupled to the reset input R of flip-flop 202. The Q output of flip-flop 206 is coupled to an input of an exclusive-OR gate 210. The $\overline{Q}$ output of flip-flop 206 is coupled to the data input of flip-flop 206. The second input of exclusive-OR gate 210 is coupled to receive the $F_{sc}$ clock signal, and produces a signal LINE at its output. The LINE signal is applied to the clock input of flip-flop 204, and to the input stage of a ten-stage shift register 212. The shift register 212 is clocked by a signal $\overline{2F_{SCD}}$, which is a phase-shifted replica of the $2F_{sc}$ signal of FIG. 4c.

A signal $LINE_F$ is produced at the output of the shift register 212 and is applied to the input of a flip-flop 214. The output of flip-flop 214, which produces a signal termed $LINE_{CF}$, is applied to the input of a flip-flop 216, the output of which is coupled to the input of a further flip-flop 218. Flip-flops 216 and 218 are clocked by the $\overline{2F_{SCD}}$ clock signal produced at the Q output of a D-type flip-flop 220. The flip-flop 220 receives the $2F_{sc}$ signal at its data input and the $\overline{4F_{sc}}$ clock signal at its clock input.

The $I_{CL}$ and $-I_{CL}$ signals are applied to the inputs of an OR gate 230, the output of which is coupled to inputs of AND gates 232 and 234. The $LINE_F$ signal is applied to the second input of AND gate 232, which produces a signal $I_{FC}$ at its output. The $LINE_{CF}$ signal is applied to the second input of AND gate 234 to produce a signal $Q_{CFC}$ at the output of that gate.

The $Q_{CL}$ and $-Q_{CL}$ signals are applied to the inputs of an OR gate 240, the output of which is coupled to an input of an AND gate 242. The signal produced at the output of OR gate 240 is also used to clock flip-flop 214. The $LINE_F$ signal is applied to a second input of AND gate 242, which produces a signal identified as $Q_{FC}$ and $I_{CFC}$ at its output.

When the A/D converter of FIG. 1 samples the composite video signal at a $4f_{sc}$ rate, each line of the NTSC signal will comprise 910 codeword samples. FIG. 7a illustrates the last seven codewords of one line of information, which line begins with a +I sample (not shown) and ends with a +Q codeword 910. The succeeding line begins with a −I sample 1, and ends with a −Q sample (not shown). The reversal of the clock phasing for proper comb filtering is done during the last two codewords of each line, and is initiated by the leading edge of the horizontal blanking signal shown in FIG. 7g. The codeword sequence of FIG. 7a represent the codewords at the input to the bandpass filter shift register 40 of FIG. 2.

Initially it will be assumed that flip-flops 202, 204 and 206 are all reset. Under these conditions, the LINE signal at the output of exclusive-OR gate 210 will be in phase with the $F_{sc}$ signal, as seen by comparing pulse 300 of FIG. 7b with pulse 302 of the LINE signal of FIG. 7h. The leading edge of the horizontal blanking signal of FIG. 7g, illustratively shown to occur during codeword 95 of the line that is ending, sets flip-flop 202 at time $t_1$ in FIG. 7g. The next rising edge of the LINE signal occurs at time $t_2$ in FIG. 7h, which will set flip-flop 204 at that time. The signal at the Q output of flip-flop 204 is shown in FIG. 7j.

The setting of flip-flop 204 in turn sets flip-flop 206, causing the signal at its Q output to go high. This results in a reversal of the phase of the LINE signal following time $t_2$, as shown in FIG. 7h. The pulses of the LINE signal are now coincident with pulses of the $-I_{CL}$ and $-Q_{CL}$ clock signals of FIGS. 7e and 7f, whereas previously they were coincident with the $I_{CL}$ and $Q_{CL}$ pulses of FIGS. 7c and 7d. Flip-flop 202 is reset at time $t_2$ by the low-going signal at the $\overline{Q}$ output of flip-flop 204, and flip-flop 204 is reset at time $t_3$ by a low-going signal (shown in FIG. 7i) produced by a NAND gate 244, which is coupled to receive the $4F_{sc}$ and $\overline{2F_{sc}}$ clock signals.

At the time that the LINE signal changes phase, no immediate change in system operation occurs, since the final codewords of the ending line are just entering the shift register 40 of the input bandpass filter of FIG. 2. Fifteen cycles of the $4F_{sc}$ clock are required for the codeword samples to reach the impulse response center of the bandpass filter at the output of shift register stage $\tau_{15}$. Tapped signals must then propagate through the coefficient weighting circuits 50 and the adder tree 60 before the filtered signal is available to be latched into the $L_I$ and $L_Q$ latches. For purposes of illustration, it is assumed that the coefficient weighting circuits 50 each exhibit a propagation time of 66 nanoseconds, and that each adder in the adder tree exhibits a propagation time of 40 nanoseconds. Since each tapped signal in the bandpass filter must pass through one coefficient weighting circuit and six adder delays, the tapped signals are delayed by approximately 306 nanoseconds between the output of the shift register stages 40 and the output of the final adder 61. Thus, filtered codewords appear at the output of adder 61 in the sequence shown in FIG. 7k with respect to the bandpass filter input codeword sequence shown in FIG. 7a. The codword sequence of FIG. 7k is delayed with respect to the codeword sequence of FIG. 7a by more than 19 cycles of the $4F_{sc}$ clock.

At the same time as the codewords at the end of the line are propagating through the bandpass filter, the LINE signal is being shifted through the ten stage shift register 212 of FIG. 5 by the $\overline{2F_{SCD}}$ clock signal. A delayed LINE signal, termed $LINE_F$, is produced at the output of shift register 212 and is shown in FIGS. 7m and 8c. The input codeword sequence of FIG. 7a is redrawn in FIG. 8a, the filtered codeword sequence of FIG. 7k is shown again in FIGS. 8d, and the $2F_{SCD}$ clock signal is shown in FIG. 8b.

Figure 8:
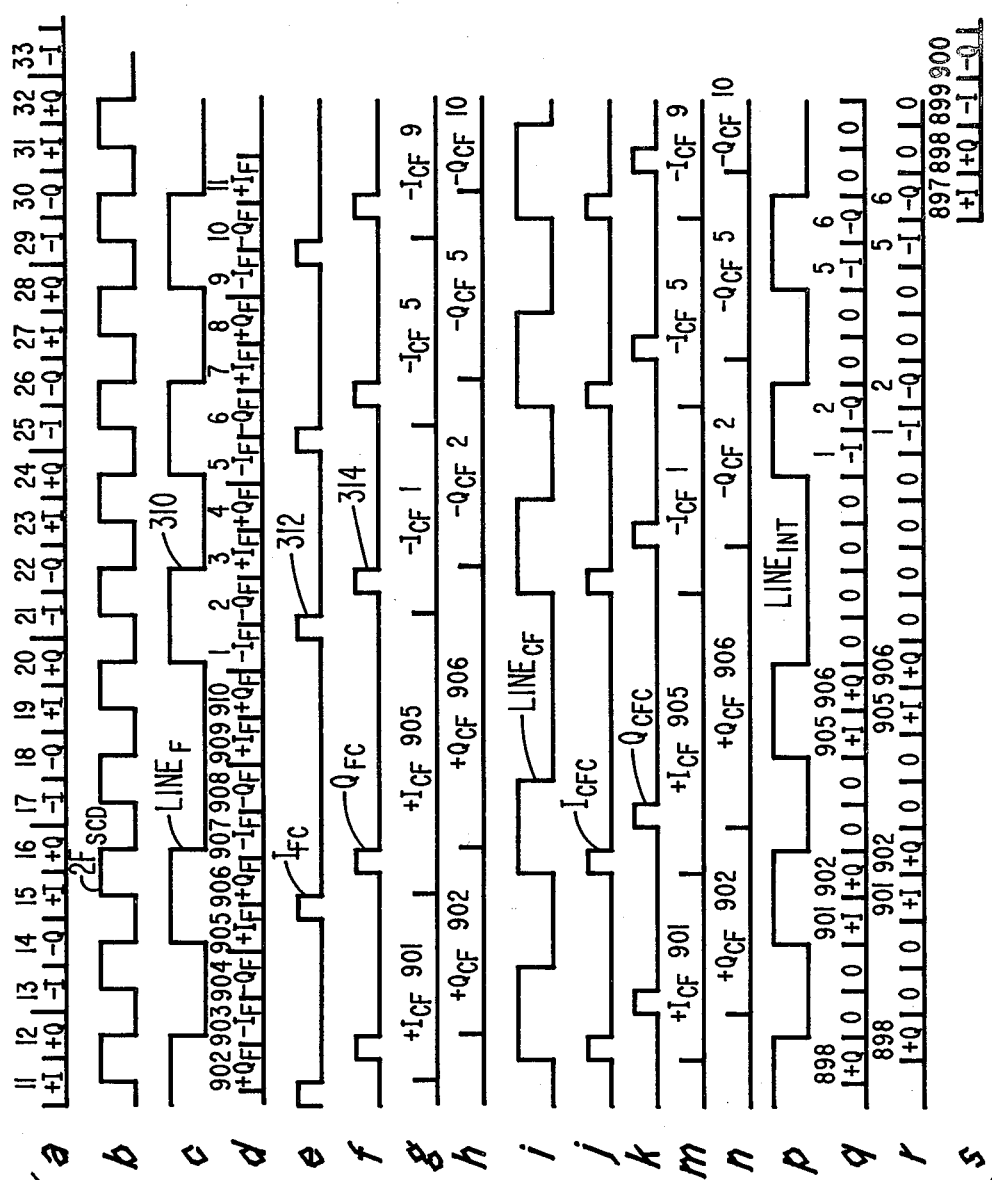
FIGS. 8 and 9 show the instantaneous signal contents at points in the embodiments of FIGS. 2, 3, 5 and 6.

During the occurrence of positive filtered I and Q codewords of the ending line, such as $+I_F$ codeword 905 and $+Q_F$ codeword 906 of FIG. 8d, the high $LINE_F$ signal of FIG. 8c gates sampling pulses through AND gates 232 and 242 of FIG. 5. These pulses, identified as $I_{FC}$ and $Q_{FC}$ in FIGS. 8e and 8f, load the $+I_F$ and $+Q_F$ codewords into latches $L_I$ and $L_Q$, respectively. During the occurrence of negative filtered I and Q codewords of the new video line, such as $-I_F$ codeword 1 and $-Q_F$ codeword 2 of FIG. 8d, the phase of the $LINE_F$ signal has changed so that the $LINE_F$ signal is high during these negative signal samples. During the new line, $LINE_F$ pulse 310 will gate sampling pulses 312 and 314 of the $I_{FC}$ and $Q_{FC}$ clock signals to latches $L_I$ and $L_Q$ to clock the negative sample codewords into the latches. The latched codewords thus alternate between positive codewords on one line and negative codewords on the following line.

The $I_{FC}$ and $Q_{FC}$ signals also clock the comb filter delay line registers 70 and 80 of FIG. 2b. The codeword samples at the outputs of the respective latches and delay line registers are of opposite polarity, and are subtractively combined in adders 74 and 84. The adders 74 and 84 are also assumed to exhibit propagation delays of 40 nanoseconds, and produce sequences of comb filtered codewords shown in respective FIGS. 8g and 8h, delayed with respect to clock signals $I_{FC}$ and $Q_{FC}$ by the 40 nanosecond adder delay. The further delayed LINE signal produced by flip-flop 214 of FIG. 5, identified as the $LINE_{CF}$ signal shown in FIG. 8i, gates pulse $Q_{CFC}$ of FIG. 8k through AND gate 242. The $I_{CFC}$ and $Q_{CFC}$ pulses of FIGS. 8j and 8k load the comb filtered codewords of FIGS. 8g and 8h into latches $L_{ICF}$ and $L_{QCF}$ of FIG. 2b, producing the comb filtered sequences of FIGS. 8m and 8n at the outputs of these latches.

The comb filtered codewords are now interpolated to a $4f_{sc}$ codeword sequence by the arrangement of FIG. 6. The $LINE_{CF}$ signal of FIG. 8i is delayed by flip-flops 216 and 218 of FIG. 5 to produce a signal $LINE_{INT}$ of FIG. 8p. The $LINE_{INT}$ signal is applied to AND gates 90 and 92 of FIG. 6 to allow passage of positive codewords through the gates during one line of video information, and negative codewords through the gates during the following line. When the $2F_{SCD}$ signal of FIG. 8b is low (and the $\overline{2F_{SCD}}$ signal is high), a comb filtered $I_{CF}$ codeword is passed by AND gate 90 and appears at the output of OR gate 94, as shown by the $+I$ and $-I$ codeword intervals of FIG. 8q. When the $2F_{SCD}$ signal is high, a comb filtered $Q_{CF}$ codeword is passed by AND gate 92 and appears at the output of OR gate 94, as shown by the $+Q$ and $-Q$ codeword intervals of FIG. 8q. And when the $LINE_{INT}$ signal is low, a zero value signal level is produced at the output of OR gate 94, as indicated by the zero value intervals of FIG. 8q.

Figure 9:
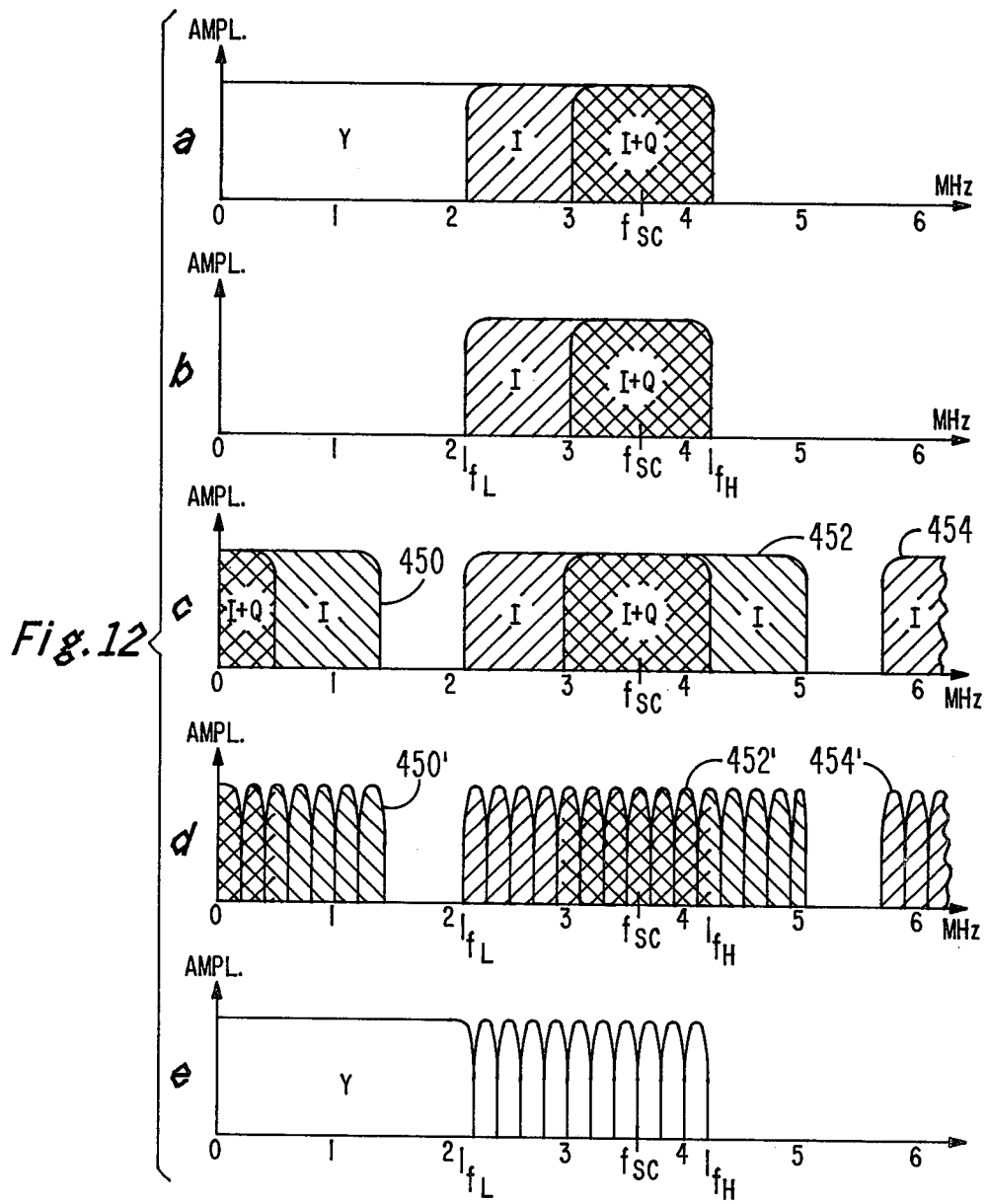

The output sequence of OR gate 94 is shifted into the shift register 140 of the output bandpass filter of FIG. 6 by the $4F_{sc}$ clock signal. The sequence appearing at the output of the first stage $\tau_1$ of register 140 is shown in FIG. 8r. The output bandpass filter delays the applied signal in the same manner as the input bandpass filter of FIG. 2 by the time required for the samples to reach the impulse response center (center tap) of the filter and then to propagate through the coefficient weighting circuits 150 and the adder tree 160. By virtue of the polarity and magnitude of the coefficient values, the output bandpass filter interpolates $-I$ and $-Q$ values in the zero signal intervals of the ending line, and $+I$ and $+Q$ values in the zero signal intervals of the new line. The sequence at the output of the final adder 161 is latched into the output latch $L_{4XC}$ by the $4F_{sc}$ clock signal, producing a $4f_{sc}$ output sequence of codewords shown in FIGS. 8s and 9a. This sequence comprises comb filtered chrominance signals in the chrominance passband defined by the bandpass filter response.

The comb filtered chrominance signal is then subtractively combined with the composite video signal to produce a luminance signal which is devoid of chrominance components. The composite video signal codeword sequence at the input to the system is redrawn as FIG. 9b, and is seen to lead the comb filtered chrominance sequence by 43 cycles of the $4F_{sc}$ clock signal.

For proper combing, the composite video sequence must be brought into time coincidence with corresponding codewords of the chrominance sequence. This is done by delaying the input composite video sequence by 43 cycles of the $4F_{sc}$ clock. A thirty clock cycle delay is provided by the shift register 40 of the input bandpass filter, which produces a composite video signal sequence at the output of stage $\tau_{30}$ delayed by thirty clock cycles with respect to the input sequence. The remaining thirteen cycles of delay are provided by shift register delay line 98 of FIG. 6, which is also clocked by the $4F_{sc}$ clock. Thus, the codeword sequences at the inputs of the adder 100 are in the proper time alignment for the production of a comb filtered luminance signal.

It is seen in FIG. 8q that two zero value codewords are interspaced between each pair of I and Q codewords that are applied to the output bandpass filter, except at the end of the line when the LINE signal phase is changed. At that point there are four consecutive zero value codewords. It might be expected that this change of the codeword sequence would cause an error in the reconstituted chrominance signal, and hence an error in the comb filtered luminance signal. However, since the phase change is initiated by the horizontal blanking signal, the phase change occurs during the "front porch" interval of the horizontal blanking interval. At this point in the video signal there is no chrominance signal content, and hence the true chrominance signal values are zero. Thus, the insertion of zero values into the codeword sequence at this point will cause no errors in the resulting comb filtered signals.

Figure 10:
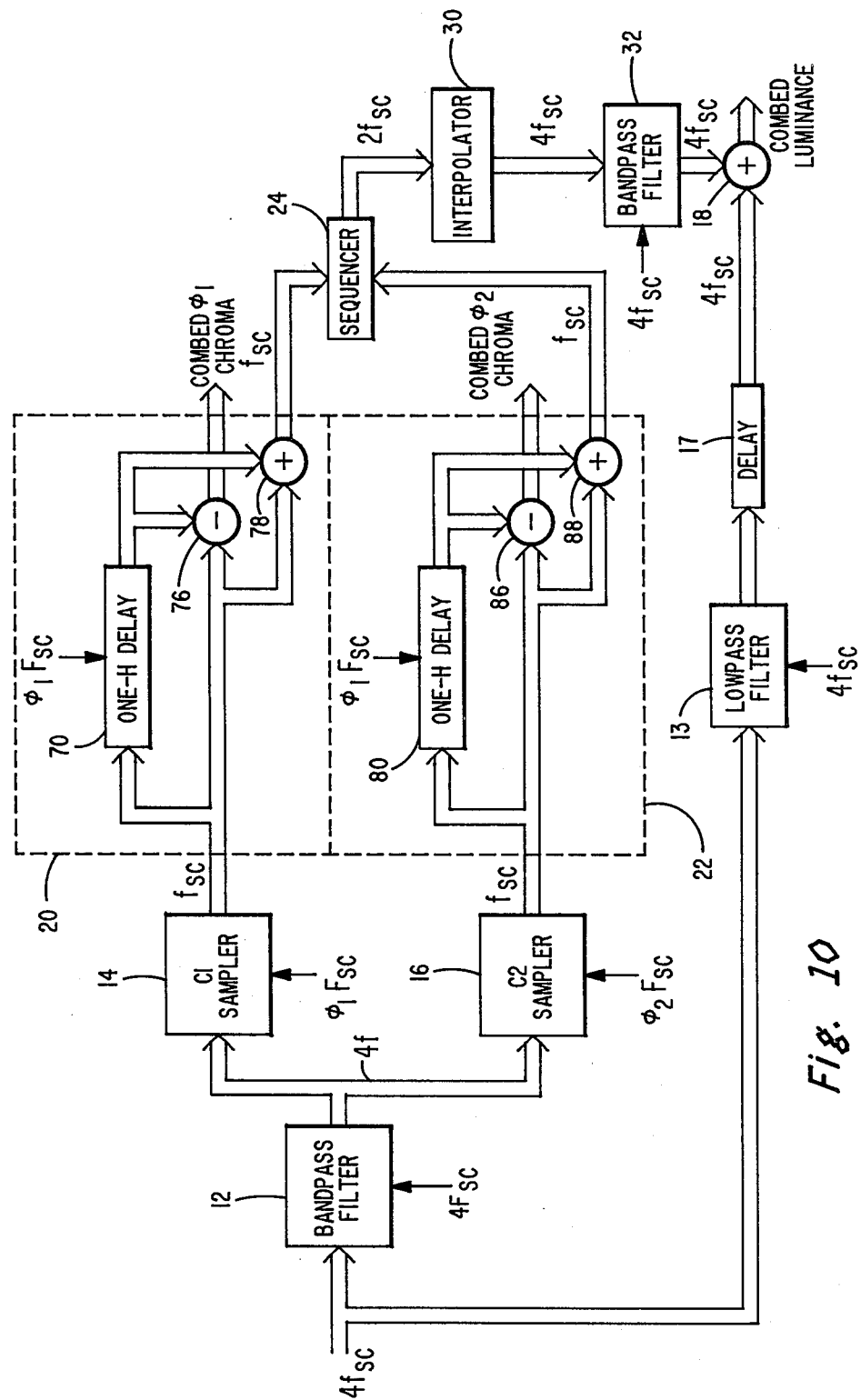
FIG. 10 illustrates in block diagram form a second embodiment of a digital comb filter system constructed in accordance with the principles of the present invention.

A second embodiment of the present invention is illustrated in FIG. 10. Elements shown and discussed in conjunction with the embodiment of FIG. 1 are shown in the embodiment of FIG. 10 and bear the same reference numerals. Whereas a comb filtered luminance signal was produced in FIG. 1 by first comb filtering the chrominance signal, then subtracting the comb filtered chrominance signal from the composite signal, the comb filtered luminance signal in FIG. 10 is produced by comb filtering a high frequency portion of the composite video signal to produce a comb filtered high frequency luminance signal portion, then adding this signal portion to a low pass filtered portion of the composite signal.

In FIG. 10, the composite video signal is first filtered by a bandpass filter 12, leaving a passband occupying frequencies about the color subcarrier frequency. The bandpass filtered signal is then subsampled by C1 and C2 samplers 14 and 16, in the same manner as FIG. 1. Signal components produced by the C1 sampler 14 are applied to a first comb filter 20, and signal components produced by the C2 samples 16 are applied to a second comb filter 22. Both subsampled signal sequences are produced at an $f_{sc}$ rate, but are in respectively different phase relationships with respect to the subcarrier signal phase, since they are produced by sampling signals $\phi_1 F_{sc}$ and $\phi_2 F_{sc}$.

The signal sequence produced by the C1 sampler 14 is applied directly to inputs of an additive combining circuit 78 and a subtractive combining circuit 76, and is applied by way of a one-H delay line 70 to second inputs of the additive and subtractive combining circuits. The one-H delay line 70 is constructed in the same manner as the shift register delay line 70 of FIG. 2.

The signal sequence produced by the C2 sampler 16 is applied to inputs of a one-H delay line 80, an additive combining circuit 88, and a subtractive combining circuit 86. The output of the one-H delay line 80 is coupled to second inputs of the additive and subtractive combining circuits 88 and 86.

Circuits 76 and 86 subtractively combine delayed and undelayed codewords to produce comb filtered chrominance signal sequence at two phases $\phi_1$ and $\phi_2$ of the color subcarrier ($F_{sc}$) signal, in the same manner as adders 74 and 84 of FIG. 2b. Circuits 78 and 88, by additively combining the delayed and undelayed codeword sequences, produce codewords in which the chrominance components have been cancelled, leaving comb filtered luminance signal components of two different subsampling phases of the $4f_{sc}$ A/D converter clock. These comb filtered luminance signal codewords occupy the passband established by the bandpass filter 12 and are therefore high frequency luminance signal components.

The differently phased luminance codewords produced by additive combining circuits 78 and 88 are interleaved in a single codeword sequence by a sequencer 24, which codeword sequence is at a $2f_{sc}$ rate. The $2f_{sc}$ codeword sequence is interpolated to a $4f_{sc}$ rate and filtered by a bandpass filter 32, which produces a $4f_{sc}$ rate sequence of codewords occupying the passband of bandpass filter 32. The sequencer 24, interpolator 30 and bandpass filter 32 may be implemented in the same manner as the like elements in FIG. 1, using the configuration shown in FIG. 6. The $4f_{sc}$ rate comb filtered luminance signal sequence is applied to one input of an adder 18.

The original composite video signal samples that are applied to the bandpass filter 12 are also applied to a lowpass filter 13, which is clocked by the $4F_{sc}$ clock signal. The lowpass filter 13 has a complementary frequency response to that of the bandpass filter 12. That is, the transition bands of the two filters are equal but opposite, intersecting approximately at the 6 dB point. The lowpass filtered codewords are delayed by delay line 17 to bring the codewords into time coincidence with corresponding codewords prouced by the bandpass filter 32. The delayed codewords, which occupy the low frequency portion of the spectrum, are additively combined with high frequency, comb filtered luminance signals from bandpass filter 32 by adder 18, thereby producing a luminance signal which is comb filtered over that portion of the spectrum formerly occupied by the chrominance information.

Figure 11:
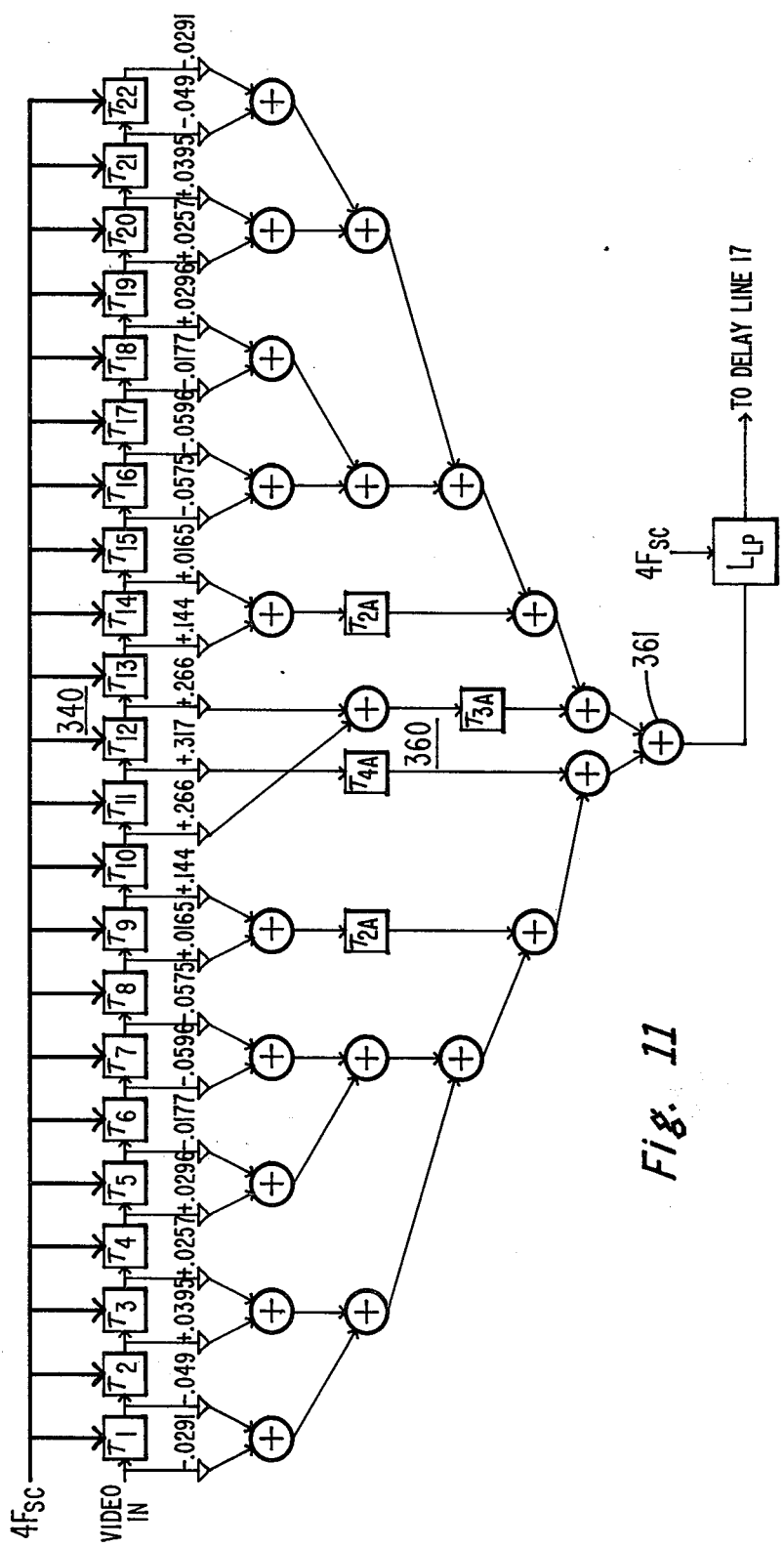
FIG. 11 illustrates in block diagram form a digital lowpass filter suitable for use in the embodiment of FIG. 10.

A digital lowpass filter, suitable for use as lowpass filter 13 in FIG. 10, is shown in detail in FIG. 11. The composite video signal codewords are applied to the first stage $\tau_1$ of a twenty-two stage shift register 340. The input of the first stage and the outputs of all the stages are coupled to respective coefficient weighting circuits 350. Signals tapped from the shift register 340 are weighted by the coefficient weighting circuits and the tap-weighted signals are combined by an adder tree 360. The adder tree 360 includes delays shown at $\tau_{2A}$, $\tau_{3A}$ and $\tau_{4A}$ exhibiting delays which are multiples of the propagation delays exhibited by the adders in the tree. These delays equalize the signal delays in each of the paths between the coefficient weighting circuits 350 and the output of the final adder 361 of the adder tree. Lowpass filtered codewords at the output of adder 361 are latched into an output latch $L_{LP}$ by the $4F_{sc}$ clock signal.

The lowpass filter of FIG. 11 exhibits a total propagation delay equal to the time required for signals to be shifted from the input of the first stage $\tau_1$ to the output of the center stage $\tau_{11}$, plus the propagation time of a coefficient weighting circuit, plus the propagation delay of six adders. If the coefficient weighting circuits are assumed to exhibit a propagation delay of 66 nanoseconds and the adders are assumed to provide a delay of 40 nanoseconds each, the time interval required for a signal to appear at the output of adder 361 is approximately 15.37 cycles of the $4F_{sc}$ clock. Therefore, filtered codewords will appear at the output of latch $L_{LP}$ sixteen $4F_{sc}$ clock cycles after the corresponding codewords are applied to the input of the filter. This delay of the lowpass filter decreases the delay required for delay line 17 to bring the filtered codewords into time correspondence with codewords produced by the bandpass filter 32. For instance, if comb filtered codewords are delayed by forty-three $4F_{sc}$ clock cycles between the input of the bandpass filter 12 and the output of the bandpass filter 32, which was the case in the embodiment of FIGS. 2 and 6, this delay could be matched by the sixteen cycles of delay of the lowpass filter plus the delay of twenty-seven stages of the shift register of the input bandpass filter 12. In such a configuration, the input of the first stage $\tau_1$ of the lowpass filter of FIG. 11 would be coupled to the output of the twenty-seventh stage of the bandpass filter shift register (FIG. 2), thereby eliminating the need for a separate delay line 17.

Several of the concepts inherent in the present invention are graphically illustrated by the idealized waveforms of FIG. 12. The A/D converter produces video signal codewords occupying the conventional video band, such as that shown in FIG. 12 for an NTSC color signal. The video signal includes luminance (Y) information extending from zero to about 4.2 MHz. I color mixture signal information is interleaved with the luminance information from about 2.1 to 4.2 MHz, and Q color mixture signal information is interleaved over the range from about 3 to 4.2 MHz. In the range from 3 to 4.2 MHz, the color mixture signal information is modulated as double sideband signals of the color subcarrier $f_{sc}$ (3.58 MHz). When the composite video signal is filtered by bandpass filter 12, a passband as shown in FIG. 12b results, containing the color mixture signal information between high and low cutoff frequencies $f_H$ and $f_L$.

By reason of the subsampling of the bandpass filtered signals at phases $\phi_1$ and $\phi_2$ of an $f_{sc}$ rate subsampling signal, replicas of the passband of FIG. 12b are reproduced about the $f_{sc}$ subsampling frequency and harmonics thereof, several of which are shown in FIG. 12c. The lowest frequency replicated band 450 includes demodulated I and Q color mixture signal information by reason of the $f_{sc}$ subcarrier subsampling frequency. The next passband 452 comprises two passbands which overlap or alias between 3 and 4.2 MHz about the $f_{sc}$ frequency. However, by reason of the phase and frequency relationships of the signal components in the overlap region, signal components reinforce one another. No interference components destructive of the color information signals are created by this aliasing. A portion of a third, higher frequency passband 454 is also shown.

The subsampled signals are then comb filtered, which effectively comb filters all of the replicated passbands, as illustrated by FIG. 12d. The passband 450' now contains comb filtered and demodulated color mixture signal information. The "teeth" of the comb filter responses are separated by 15,734 Hz intervals, the horizontal line rate, for the NTSC signal.

The output bandpass filter passes that portion of the bands of FIG. 12d which are located between cutoff frequencies $f_L$ and $f_H$. This band contains modulated and comb filtered chrominance information. When the signal of this passband are subtracted from the composite signal of FIG. 12a, a complementary comb filtered luminance signal is produced as shown in FIG. 12e, which is comb filtered over the $f_L$ to $f_H$ frequency band. The output bandpass filter 32 is required to eliminate the signals in the passband 450' of FIG. 12d from the chrominance signals which are subtracted from the composite video signal. The combination of signals in passband 450' with the composite video signal, if allowed to occur, would undesirably introduce unwanted signal information into the low frequency region of the luminance signal.

What is claimed is:

1. In a television signal processing system, including a source of sampled data video signals at a given data rate having first and second frequency interleaved signal components in a video passband, a comb filter system comprising:
   a first bandpass filter having an input responsive to said sampled data video signals and an output at which filtered signal samples occupying a portion of said video passband are produced at said given data rate;
   a comb filter, responsive to said filtered signal samples, and operating at a reduced data rate which is less than said given data rate, for producing a comb filtered signal at said reduced data rate; and
   a second bandpass filter responsive to said comb filtered signal for producing a comb filtered signal at said given data rate which occupies a portion of said video passband.

2. In a television signal processing system, including a source of sampled data video signals at a given data rate having first and second frequency interleaved signal components in a video passband, a comb filter system comprising:
   a first bandpass filter having an input responsive to said sampled data video signals and an output at which filtered signal samples occupying a portion of said video passband are produced at said given data rate;
   a comb filter, responsive to said filtered signal samples, and operating at a reduced data rate which is less than said given data rate, for producing a comb filtered signal at said reduced data rate;
   an interpolator having an input responsive to said comb filtered signal and an output at which a replica of said comb filtered signal is produced at said given data rate; and
   a second bandpass filter, coupled to the output signal at said given data rate for producing a comb filtered signal which occupies a portion of said video passband.

3. The arrangement of claim 1 or 2, further comprising:
   means, responsive to said comb filtered signal produced by said second bandpass filter and to said video signals provided by said signal source, for combining said signals to produce a second comb filtered signal.

4. In a television receiver, including a source of analog video signals occupying a given passband and containing first and second frequency interleaved signal components, a signal separation system comprising:

an analog to digital converter responsive to said analog video signals for producing a sequence of digitized video signal samples in response to a sampling signal of a given frequency;
a first bandpass filter having an input responsive to said digitized video signal sequence and an output at which a sequence of filtered video signal samples occupying a portion of said passband is produced at said given frequency;
a first comb filter having an input responsive to selected ones of said filtered video signal samples and an output at which a first sequence of comb filtered signal samples is produced in a first phase relationship with said filtered video signal sample sequence;
a second comb filter having an input responsive to selected ones of said filtered video signal samples and an output at which a second sequence of comb filtered signal samples is produced in a second phase relationship with said filtered video signal sample sequence;
means for combining said first and second sequences of comb filtered signal samples to produce a first comb filtered signal corresponding to said first interleaved signal components;
a second bandpass filter having an input responsive to said first comb filtered signal for producing a replica of said first comb filtered signal in a sequence of signal samples at said given frequency which occupies a portion of said passband; and
a signal combining circuit having a first input responsive to said replica of said first comb filtered signal, a second input responsive to said sequence of digitized video signal samples produced by said analog to digital converter, and an output at which a second comb filtered signal corresponding to said second interleaved signal components is produced.

5. The arrangement of claim 4, further comprising:
means for producing a sampling clock signal including sampling pulses of first, second, third and fourth phases,
wherein said analog to digital converter and said bandpass filters are responsive to said sampling clock signal;
means for producing a first subsampling clock signal including subsampling pulses corresponding to the first phase of said sampling clock signal,
wherein said first comb filter is responsive to said first subsampling clock signal for selecting said ones of said filtered video signal samples; and
means for producing a second subsampling clock signal including subsampling pulses corresponding to a second phase of said sampling clock signal,
wherein said second comb filter is responsive to said second subsampling clock signal for selecting said second-named ones of said filtered video signal samples.

6. The arrangement of claim 5, further including:
means for producing a third subsampling clock signal including subsampling pulses corresponding to a third phase of said sampling clock signal; and
means for producing a fourth subsampling clock signal including subsampling pulses corresponding to a fourth phase of said sampling clock signal;
wherein said comb filters are responsive to said first and second subsampling clock signals during a first video line, and to said third and fourth subsampling clock signals during a second, succeeding video line.

7. The arrangement of claim 4 or 6, wherein said first comb filtered signal comprises a comb filtered chrominance signal; and wherein said signal combining circuit comprises a subtractive signal combining circuit responsive to a replica of said comb filtered chrominance signal and said sequence of digitized video signal samples for producing a comb filtered luminance signal.

8. The arrangement of claim 4, wherein said first comb filtered signal exhibits a sample rate which is less than said given frequency, and said second bandpass filter is responsive to said first comb filtered signal for interpolating sample values so as to produce said replica of said first comb filtered signal exhibiting a sample rate which is equal to said given frequency.

9. The arrangement of claim 4 or 8, wherein said first and second bandpass filters exhibit substantially the same passband response characteristic; and further comprising:
an equalizing delay coupled between said analog to digital converter and said second input of said signal combining circuit.

10. Apparatus for comb filtering a sampled data composite signal of a given data rate including first and second frequency interleaved components comprising:
a first comb filter responsive to every Nth signal sample for generating a first comb filtered signal where N is an integer;
a second comb filter responsive to every Nth signal sample different from said samples in said first comb filter for generating a second comb filtered signal, said first and second comb filters operating at a lesser rate than the rate of said sampled data composite signal;
means responsive to said first and second comb filtered signals for generating a third comb filtered signal at said sampled data composite signal rate, said third comb filtered signal corresponding to a combed manifestation of one of said first and second interleaved components;
a bandpass filter responsive to said third comb filtered signal for passing a prescribed spectrum thereof; and
means responsive to said sampled data composite signal and the signal produced by said bandpass filter for producing a fourth comb filtered signal wherein said fourth comb filtered signal and said third further signal correspond substantially exclusively to said first and said second frequency interleaved signal components respectively.

11. In a television signal processing system, including a source of sampled data video signals at a given data rate having frequency interleaved luminance and chrominance signal components in a video passband, a signal separation arrangement comprising:
a first bandpass filter having an input responsive to said sampled data video signals for producing a sequence of filtered signal samples occupying a portion of said passband;
a comb filter, responsive to selected ones of said filtered signal samples for producing a comb filtered luminance signal at a reduced rate which is less than said given data rate;
a second bandpass filter having an input responsive to said comb filtered luminance signal and an output at which a comb filtered luminance signal is produced at said given data rate which occupies a portion of said passband; and
means, having a first input responsive to said comb filtered luminance signal produced by said second bandpass filter, a second input responsive to said sampled data video signals which occupy a portion of said video passband, and an output for producing a comb filtered luminance signal occupying said video passband.

12. The arrangement of claim 11, further comprising:
a lowpass filter coupled between said source of sampled data video signals and said second input of said comb filtered luminance signal producing means, said lowpass filter exhibiting a complementary passband response characteristic to that of said second bandpass filter.

13. The arrangement of claim 11 or 12, wherein said comb filter comprises a shift register, an additive combining circuit, and a subtractive combining circuit, each having an input responsive to selected ones of said filtered signal samples, the output of said shift register being coupled to second inputs of said additive and subtractive combining circuits, said additive combining circuit producing said reduced data comb filtered luminance signal, and said subtractive combining circuit producing a reduced rate comb filtered chrominance signal.

* * * * *